US009688233B2

(12) United States Patent
Lee (10) Patent No.: US 9,688,233 B2
(45) Date of Patent: Jun. 27, 2017

(54) CURTAIN AIRBAG APPARATUS AND METHOD OF MANUFACTURING THE SAME

(71) Applicant: HYUNDAI MOBIS Co.,Ltd., Seoul (KR)

(72) Inventor: Jong Seob Lee, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 0 days.

(21) Appl. No.: 15/048,132

(22) Filed: Feb. 19, 2016

(65) Prior Publication Data

US 2016/0250991 A1   Sep. 1, 2016

(30) Foreign Application Priority Data

Feb. 27, 2015   (KR) .................... 10-2015-0028280

(51) Int. Cl.
| | |
|---|---|
| B60R 21/217 | (2011.01) |
| B60R 21/232 | (2011.01) |
| B60R 21/235 | (2006.01) |
| B60R 21/2342 | (2011.01) |
| B60R 21/2346 | (2011.01) |

(52) U.S. Cl.
CPC .......... *B60R 21/217* (2013.01); *B60R 21/232* (2013.01); *B60R 21/235* (2013.01); *B60R 21/2342* (2013.01); *B60R 21/2346* (2013.01); *B60R 2021/23509* (2013.01); *B60R 2021/23538* (2013.01)

(58) Field of Classification Search
CPC .............. B60R 21/217; B60R 21/2171; B60R 21/2346; B60R 21/2342; B60R 21/232; B60R 21/235; B60R 2021/23509; B60R 2021/23538
See application file for complete search history.

(56) References Cited

U.S. PATENT DOCUMENTS

| | | | | |
|---|---|---|---|---|
| 2004/0188987 A1* | 9/2004 | Salmo | ................... | B60R 21/232 280/729 |
| 2010/0164209 A1* | 7/2010 | Magnin | ................. | B60R 21/232 280/740 |
| 2012/0049496 A1* | 3/2012 | Gamill | ............... | B60R 21/2346 280/742 |
| 2014/0110923 A1* | 4/2014 | Maita | ................... | B60R 21/213 280/730.2 |
| 2014/0306435 A1* | 10/2014 | Lee | ....................... | B60R 21/261 280/742 |
| 2016/0280179 A1* | 9/2016 | Jinnai | ................. | B60R 21/2346 |

* cited by examiner

*Primary Examiner* — Drew J Brown
(74) *Attorney, Agent, or Firm* — H.C. Park & Associates, PLC (57) ABSTRACT

A curtain airbag apparatus includes an inflator configured to generate gas, an airbag configured to be inflated when the gas flows into the airbag, and a diffuser pocket disposed in the airbag and coupled to the inflator to distribute the gas to front and rear sides of the airbag. The diffuser pocket includes a first surface, a second surface, a first concave portion formed at a rear end of the first surface, a second concave portion formed at a rear end of the second surface, a first main sewed portion formed by sewing lower ends of the first and second surfaces, a second main sewed portion formed by sewing the first and second concave portions, and a tear seam portion formed by sewing the first surface in proximity to the first concave portion and the second surface in proximity to the second concave portion.

8 Claims, 7 Drawing Sheets

FIG. 9

CURTAIN AIRBAG APPARATUS AND METHOD OF MANUFACTURING THE SAME

CROSS-REFERENCE TO RELATED APPLICATION

The present application claims priority from and the benefit of Korean Patent Application Number 10-2015-0028280, filed Feb. 27, 2015, which is hereby incorporated by reference for all purposes as if fully set forth herein.

BACKGROUND

Field

Exemplary embodiments relate to a curtain airbag apparatus and a method of manufacturing the same. More particularly, exemplary embodiments relate to a curtain airbag apparatus and a method of manufacturing the same, in which a diffuser pocket for distributing gas generated by an inflator into an airbag is installed in the airbag.

Discussion of the Background

In general, an automobile is provided with an airbag apparatus, which may be a safety apparatus inflated by gas that flows into the airbag, to protect an occupant at the time of an accident. An airbag apparatus may be installed at various portions of an automobile as necessary. An airbag apparatus may include a driver airbag apparatus mounted on a steering wheel to protect a driver seated in a driver seat, a passenger airbag apparatus mounted at an upper side of a glove box to protect a passenger seated in a front passenger seat, and curtain airbag apparatuses mounted at both sides in the automobile to protect heads of the occupants.

Among the airbag apparatuses, a curtain airbag apparatus is installed to be elongated in a front and rear direction of the automobile, inside an A-pillar and a C-pillar, which are disposed at upper sides of a front door and a rear door, through which the occupants get in and out of the automobile. The curtain airbag apparatus may include an inflator, which is a gas generator, and an airbag, which is deployed from the upper sides of the front door and the rear door while covering window glasses of the doors like a curtain, when gas generated by the inflator flows into the airbag. The curtain airbag apparatus may be disposed between the head of the occupant and the front door and the rear door, thereby protecting the head of the occupant at the time of a broadside collision of the automobile.

The inflator may be installed at a front upper end of the airbag, a rear upper end of the airbag, or a central upper end of the airbag. When the inflator is installed at the front upper end of the airbag, gas generated by the inflator is discharged toward the rear side in the airbag, such that the airbag is gradually inflated from the front side to the rear side. When the inflator is installed at the rear upper end of the airbag, gas generated by the inflator is discharged toward the front side in the airbag, such that the airbag is gradually inflated from the rear side to the front side.

As described above, when the inflator is installed at the front upper end of the airbag or the rear upper end of the airbag, the gas generated by the inflator flows in a single direction, such that the gas flows from the front side to the rear side inside the airbag, or flows from the rear side to the front side inside the airbag. However, when the inflator is installed at the central upper end of the airbag, the gas generated by the inflator may flow in two directions toward the front side and the rear side inside the airbag, and as a result, a diffuser pocket, which distributes the gas generated by the inflator to the front side and the rear side inside the airbag, may be utilized.

The diffuser pocket may be disposed in the airbag to be coupled to the inflator, and distributes the gas generated by the inflator to the front side and the rear side inside the airbag. However, because the inflator generates gas by exploding a gas generating medium included in the inflator, such that the gas discharged from the inflator into the diffuser pocket has a high temperature and high pressure, and because the diffuser pocket is made of a flexible material and manufactured by sewing, the diffuser pocket may be deformed by the high-temperature and high-pressure gas injected from the inflator, or the sewed portions thereof may be broken, such that the diffuser pocket may not properly distribute the gas into the airbag.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a curtain airbag apparatus with improved rigidity of a diffuser pocket for distributing gas generated by an inflator into an airbag, and a method of manufacturing the same.

Additional aspects will be set forth in the detailed description which follows, and, in part, will be apparent from the disclosure, or may be learned by practice of the inventive concept.

An exemplary embodiment of the present invention discloses a curtain airbag apparatus including an inflator configured to generate gas, an airbag configured to be inflated when the gas flows into the airbag, and a diffuser pocket disposed in the airbag and coupled to the inflator to distribute the gas to a front side and a rear side of the airbag. The diffuser pocket includes a first surface disposed at one side thereof, a second surface disposed at the other side thereof, a first concave portion formed at a rear end of the first surface, a second concave portion formed at a rear end of the second surface, a first main sewed portion formed by sewing a lower end of the first surface and a lower end of the second surface, a second main sewed portion formed by sewing the first concave portion and the second concave portion, and a tear seam portion formed by sewing the first surface in proximity to the first concave portion and the second surface in proximity to the second concave portion.

An exemplary embodiment of the present invention also discloses a method of manufacturing a curtain airbag apparatus including spreading out a raw fabric for a diffuser pocket, the raw fabric including a first concave portion and a second concave portion disposed at a rear end thereof to be spaced apart from each other, forming a first main sewed portion by folding the raw fabric with respect to a folding line that horizontally runs between the first concave portion and the second concave portion, and sewing a lower end of a first surface disposed at one side of the folding line and a lower end of a second surface disposed at the other side of the folding line, forming a second main sewed portion by sewing the first concave portion and the second concave portion, and forming a tear seam portion by sewing the first surface in proximity to the first concave portion and the second surface in proximity to the second concave portion.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, a curtain airbag apparatus according to an exemplary embodiment and a method of manufacturing the same will be described with reference to the drawings.

Figure 1:
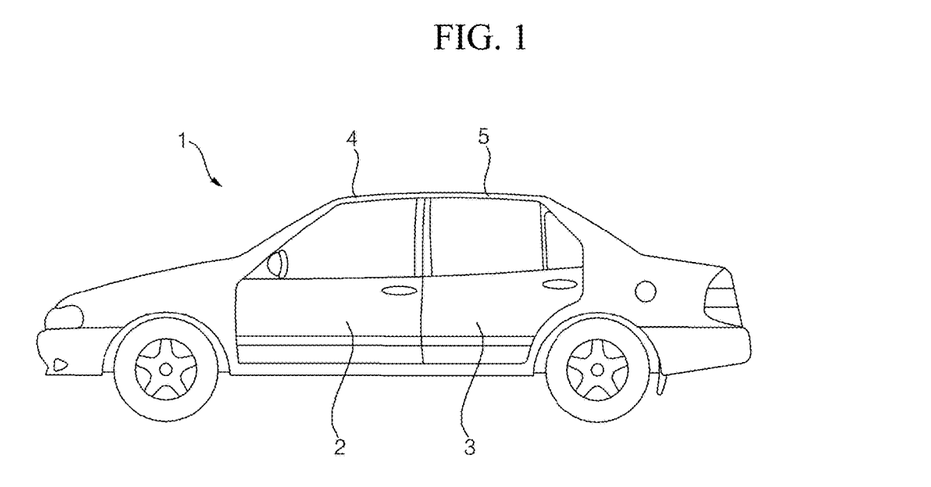
FIG. 1 is a side view illustrating an automobile in which a curtain airbag apparatus according to an exemplary embodiment is installed.
Figure 2:
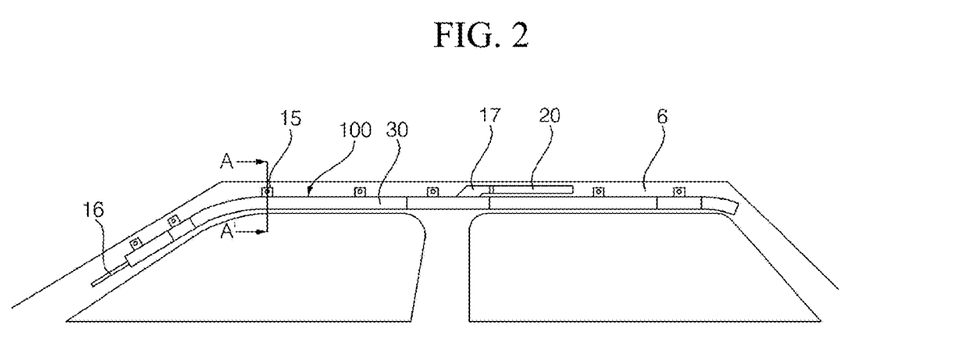
FIG. 2 is a view illustrating a state in which the curtain airbag apparatus according to an exemplary embodiment is installed in the automobile.
Figure 3:
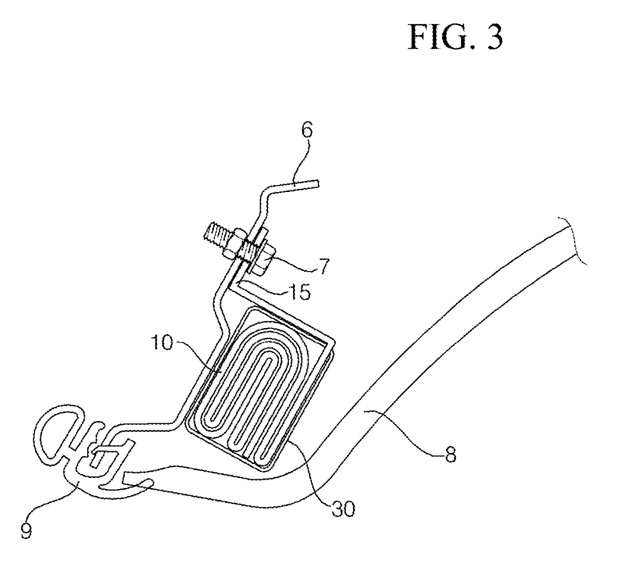
FIG. 3 is a cross-sectional view taken along line A-A' of the curtain airbag apparatus of FIG. 2.
Figure 4:
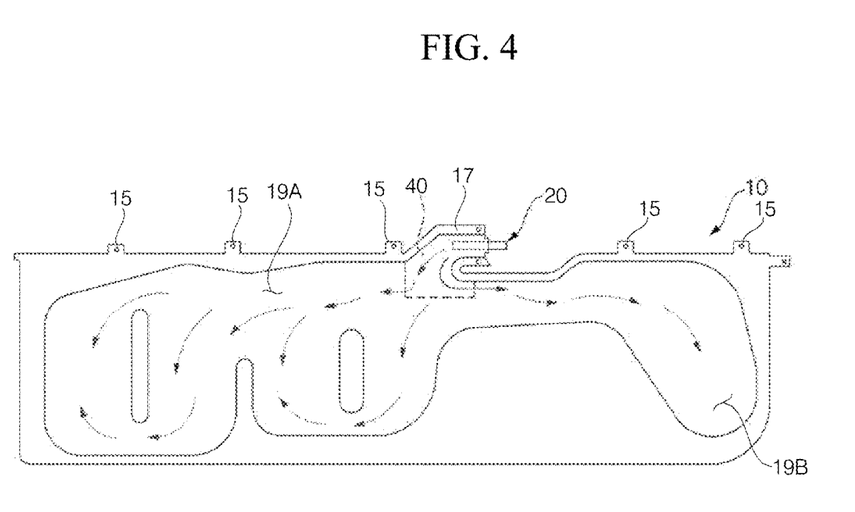
FIG. 4 is a side view illustrating a state in which an airbag of the curtain airbag apparatus according to an exemplary embodiment is deployed.

FIG. 1 is a side view illustrating an automobile in which a curtain airbag apparatus according to an exemplary embodiment is installed. FIG. 2 is a view illustrating a state in which the curtain airbag apparatus according to an exemplary embodiment is installed in the automobile. FIG. 3 is a cross-sectional view taken along line A-A' of the curtain airbag apparatus of FIG. 2. FIG. 4 is a side view illustrating a state in which an airbag of the curtain airbag apparatus according to an exemplary embodiment is deployed.

Referring to FIGS. 1 to 4, a curtain airbag apparatus 100 according to an exemplary embodiment is mounted at an upper side of an automobile 1, so as to be elongated in a front and rear direction.

A front door 2 and a rear door 3, through which occupants (including both a driver and a passenger) get in and out of the automobile 1, are provided at a lateral side of the automobile 1. An A-pillar 4 is disposed at an upper side of the front door 2, a C-pillar 5 is disposed at an upper side of the rear door 3, and a B-pillar (not illustrated) is disposed between the front door 2 and the rear door 3, so as to be elongated in a vertical direction.

The curtain airbag apparatus 100 is mounted on a side inner panel 6, which is disposed inside the A-pillar 4 and the C-pillar 5, so as to be elongated in the front and rear direction. Hereinafter, the side inner panel 6 will be described as an automotive body 6.

The curtain airbag apparatus 100 includes an inflator 20, which generates gas, and an airbag 10, which is connected with the inflator 20 and inflated and deployed when gas generated by the inflator 20 flows into the airbag 10, to protect a head of the occupant.

The airbag 10 is folded and encapsulated in an airbag cover 30, and is mounted on the automotive body 6, which is disposed inside the A-pillar 4 and the C-pillar 5, by means of fastening members 7. Mounting tabs 15, which is mounted on the automotive body 6 by means of the fastening members 7, is formed at an upper end of the airbag 10.

The airbag cover 30 may be made of a flexible fabric material, which may be substantially similar to a material forming the airbag 10. Holes (not illustrated) are formed at an upper side of the airbag cover 30, such that the mounting tabs 15 may be disposed at the outside of the airbag cover 30 through the holes, and then are mounted on the automotive body 6 through the fastening members 7. In addition, a tear line (not illustrated), which may be torn by an expansive force of the airbag 10, is formed at a lower side of the airbag cover 30. More particularly, the airbag 10 may tear the tear line while being inflated, and then the airbag 10 may be deployed at the outside of the airbag cover 30.

The curtain airbag apparatus 100 is covered by a head liner 8, such that the curtain airbag apparatus 100 is invisible from the interior of the automobile. Here, the head liner 8 refers to a member that is made of a fabric material and covers a roof panel (not illustrated) of the automobile 1 from the interior of the automobile 1. The head liner 8 is fastened by a weather strip 9 disposed at a lower end of the automotive body 6. When the airbag 10 is inflated, the head liner 8 is detached and separated from the weather strip 9 by an expansive force of the airbag 10. The airbag 10 exits through a gap between the weather strip 9 and the head liner 8 and then is deployed, such that the airbag 10 is disposed between the head of the occupant and the front door 2 and the rear door 3, thereby protecting the head of the occupant.

An A-pillar tether 16, which is fixed to the automotive body 6 disposed inside the A-pillar 4, is coupled to a front end of the airbag 10. Therefore, a front side of the airbag 10 is restricted by the A-pillar tether 16 when the airbag 10 is inflated, such that the airbag 10 may be deployed without being biased rearward.

A gas inlet unit 17, which is coupled to the inflator 20, is formed at a center of an upper end of the airbag 10. A tip portion of the inflator 20, through which gas is discharged, is disposed to be inserted into the gas inlet unit 17. The airbag 10 is inflated and deployed when gas generated by the inflator 20 flows into chambers 19A and 19B of the airbag 10 through the gas inlet unit 17.

The chambers 19A and 19B include a front chamber 19A disposed at a front side with respect to the gas inlet unit 17, which is a center in the front and rear direction of the airbag 10, and a rear chamber 19B disposed at a rear side with respect to the gas inlet unit 17. The front chamber 19A is a region for protecting an occupant seated in a front seat, and the rear chamber 19B is a region for protecting an occupant seated in a rear seat.

A diffuser pocket 40 is further installed in the airbag 10. The diffuser pocket 40 is installed, such that an upper portion of the diffuser pocket 40 is inserted into the gas inlet unit 17. The diffuser pocket 40 is coupled after the tip portion of the inflator 20 is inserted into a portion of the diffuser pocket 40, which is inserted and disposed in the gas inlet unit 17. The diffuser pocket 40 distributes gas generated by the inflator 20 to the front chamber 19A and the rear chamber 19B in the airbag 10. The diffuser pocket 40 is made of a flexible fabric material that may be substantially similar to a material forming the airbag 10.

Hereinafter, the diffuser pocket 40 will be described in detail with reference to FIGS. 5 to 8.

Figure 5:
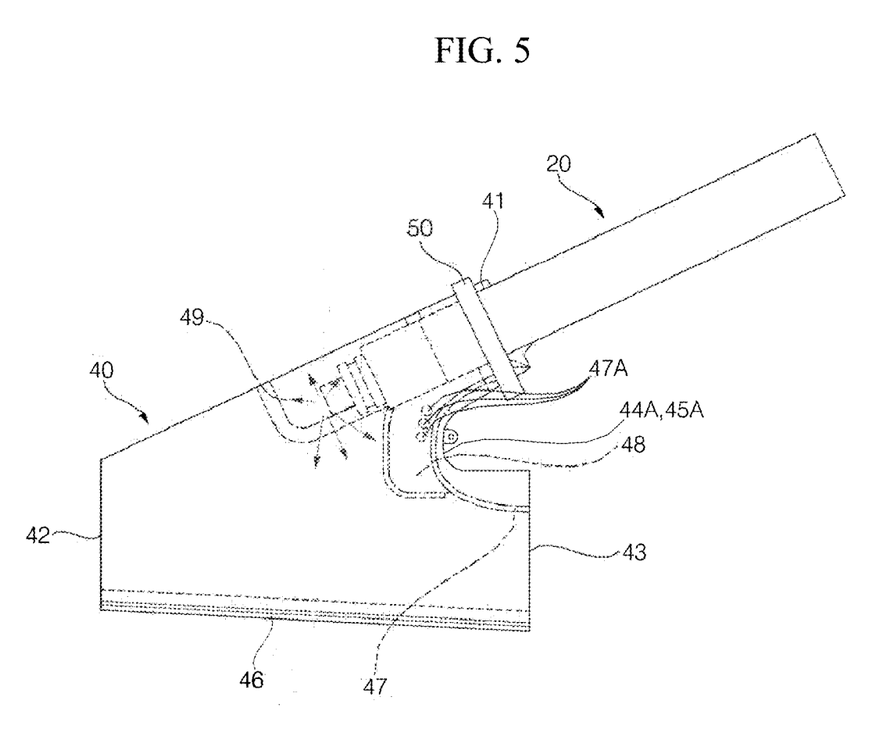
FIG. 5 is a view illustrating an inflator and a diffuser pocket of the curtain airbag apparatus of FIG. 4.
Figure 6:
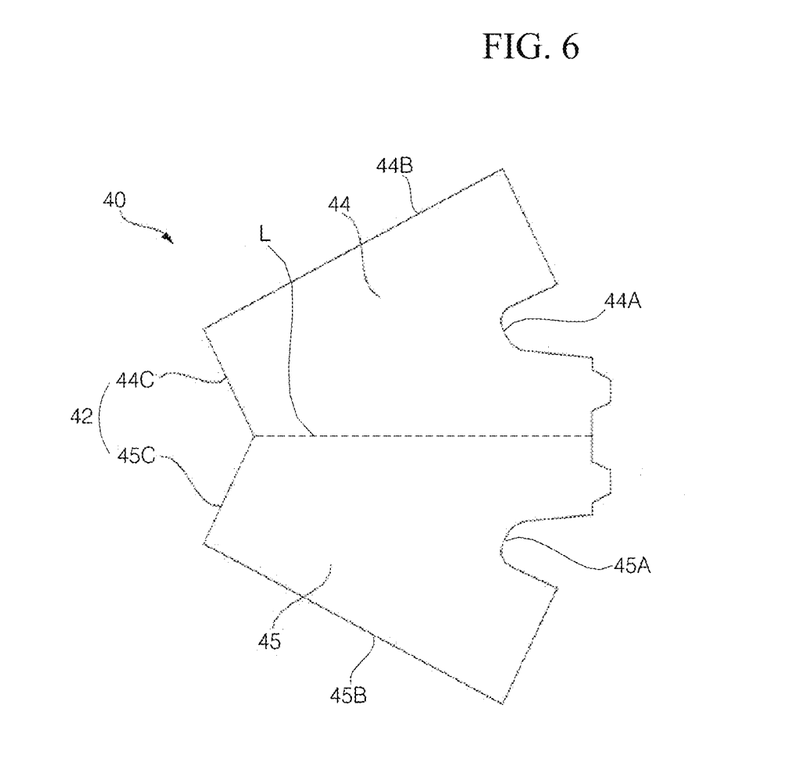
FIG. 6, FIG. 7, and FIG. 8 are views illustrating a sequence of manufacturing the diffuser pocket of FIG. 5.
Figure 7:
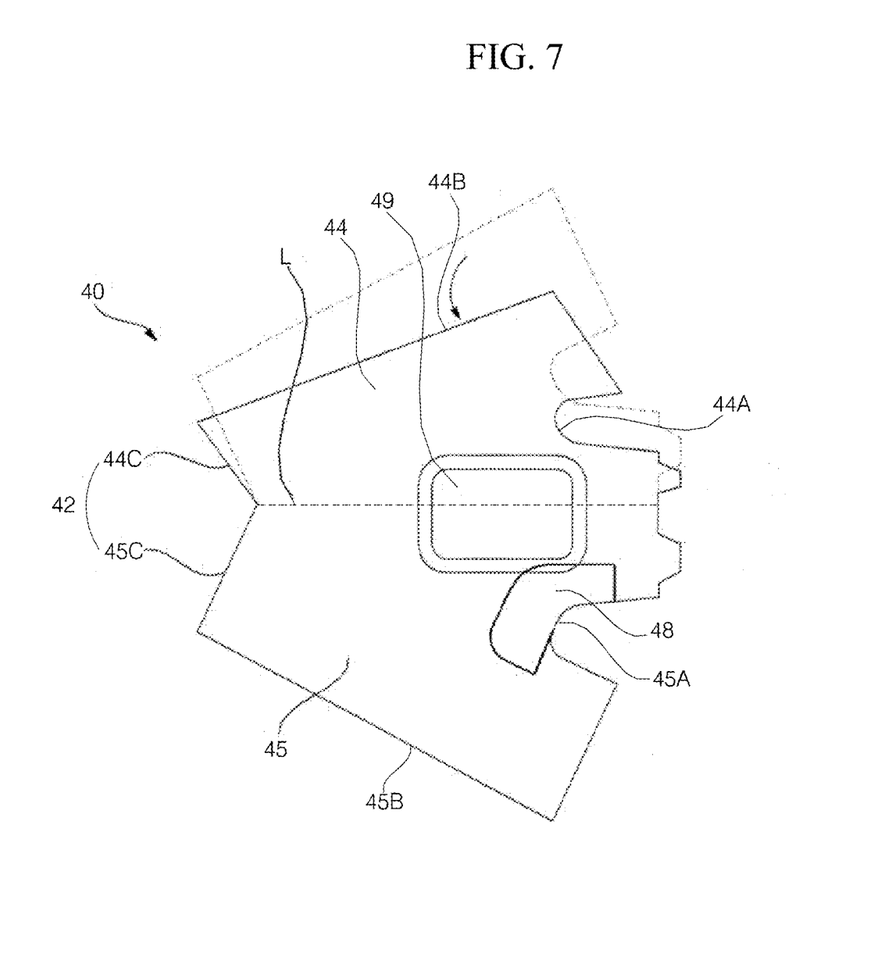
Figure 8:
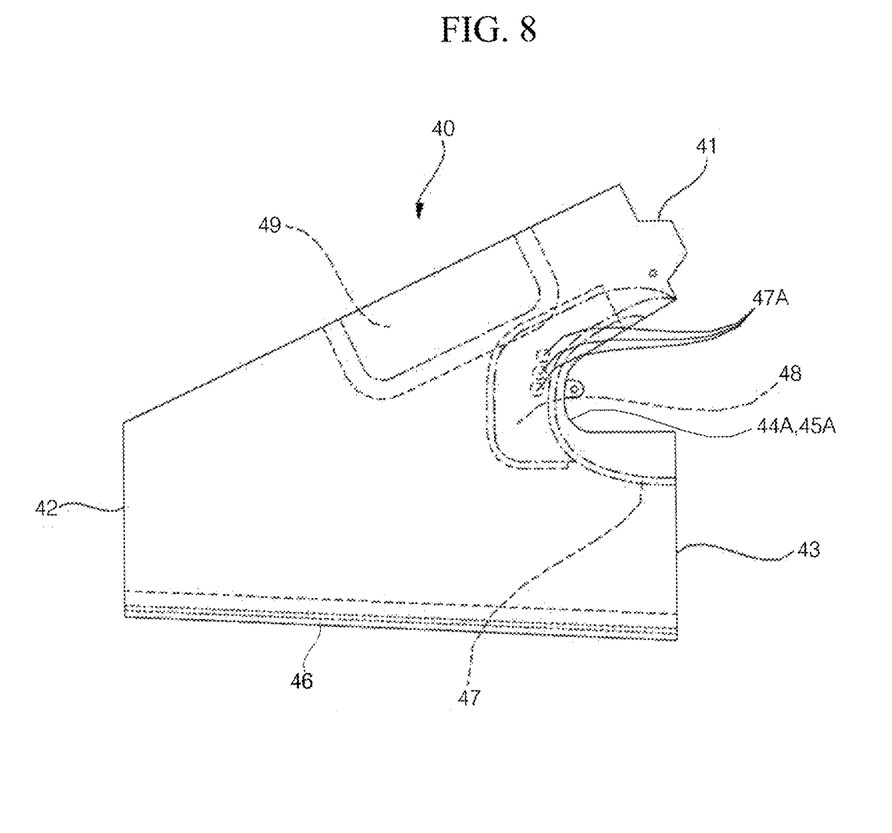

FIG. 5 is a view illustrating the inflator and the diffuser pocket of FIG. 4. FIGS. 6 to 8 are views illustrating a sequence of manufacturing the diffuser pocket of FIG. 5.

Referring to FIGS. 4 to 8, an upper portion of the diffuser pocket 40 is formed to be inclined upward toward the rear side, and a lower portion of the diffuser pocket 40 is formed horizontally. An inflator insertion hole 41, into which the tip portion of the inflator 20 is inserted, is formed at a rear end of the upper portion of the diffuser pocket 40. More particularly, the tip portion of the inflator 20 is inserted into the upper portion of the diffuser pocket 40 through the inflator insertion hole 41, and then coupled by means of a clamp 50. While FIG. 5 illustrates that the clamp 50 is coupled while directly covering an outer side of the rear end of the upper portion of the diffuser pocket 40, the clamp 50 actually covers an outer side of a rear end of the gas inlet unit 17 of the airbag 10 and couples the gas inlet unit 17, the diffuser pocket 40, and the inflator 20.

As described above, because the tip portion of the inflator 20 is inserted into the diffuser pocket 40, the gas discharged from the tip portion of the inflator 20 may flow into the diffuser pocket 40.

A front discharge hole 42, through which the gas discharged from the tip portion of the inflator 20 is discharged into the front chamber 19A in the airbag 10, is formed at a front end of the diffuser pocket 40, and a rear discharge hole 43, through which the gas discharged from the tip portion of the inflator 20 is discharged into the rear chamber 19B in the airbag 10, is formed at a rear end of the lower portion of the diffuser pocket 40.

The inflator insertion hole 41 and the rear discharge hole 43 are formed at the rear end of the diffuser pocket 40, so as to be spaced apart from each other in the vertical direction. Concave portions 44A and 45A, which are concaved towards the front discharge hole 42, are formed at the rear end of the diffuser pocket 40. The inflator insertion hole 41 is disposed at an upper side of the concave portions 44A and 45A, and the rear discharge hole 43 is disposed at a lower side of the concave portions 44A and 45A.

The diffuser pocket 40 is formed by folding the upper side thereof in half, and then being partially coupled by sewing. More particularly, after the diffuser pocket 40 is folded based on the upper side thereof, the diffuser pocket 40 includes a first surface 44 which is disposed at one side in the airbag 10, and a second surface 45 which is disposed at the other side in the airbag 10.

The concave portions 44A and 45A include a first concave portion 44A formed at a rear end of the first surface 44, and a second concave portion 45A formed at a rear end of the second surface 45.

After the diffuser pocket 40 is folded based on the upper side thereof, a first main sewed portion 46 is formed by sewing a lower end of the first surface 44 and a lower end of the second surface 45, and a second main sewed portion 47 is formed by sewing the first concave portion 44A and the second concave portion 45A.

When the first main sewed portion 46 is formed by sewing the lower end of the first surface 44 and the lower end of the second surface 45, the front discharge hole 42 is formed at the front end of the diffuser pocket 40. Thereafter, when the second main sewed portion 47 is formed by sewing the first concave portion 44A and the second concave portion 45A, the inflator insertion hole 41 and the rear discharge hole 43 are formed at the rear end of the diffuser pocket 40. More particularly, the inflator insertion hole 41 is formed by the second main sewed portion 47, the front discharge hole 42 is formed by the first main sewed portion 46, and the rear discharge hole 43 is formed by the first main sewed portion 46 and the second main sewed portion 47.

In this case, because the second main sewed portion 47 is disposed to be closer to the tip portion of the inflator 20 than the first main sewed portion 46, the yarn used for sewing may be broken from the pressure of gas discharged from the tip portion of the inflator 20. As such, the first surface 44 and the second surface 45, which correspond to the concave portions 44A and 45A, may be separated from each other, such that the diffuser pocket 40 may not distribute gas to the front chamber 19A and the rear chamber 19B of the airbag 10.

According to an exemplary embodiment, the rigidity of the second main sewed portion 47 may be reinforced. The diffuser pocket 40 further includes tear seam portions 47A for reinforcing the rigidity of the second main sewed portion 47. The tear seam portion 47A is formed by sewing the first surface 44, which is in proximity to the first concave portion 44A, and the second surface 45 which is in proximity to the second concave portion 45A. The tear seam portions 47A may be formed in plural by partially sewing the first surface 44, which is in proximity to the first concave portion 44A, and the second surface 45 which is in proximity to the second concave portion 45A. The yarn used to sew the tear seam portion 47A may perform a shock-absorbing action while being broken by the pressure of gas flowing into the diffuser pocket 40. In this manner, the yarn used to sew the second main sewed portion 47 may be prevented from being broken due to the pressure of gas flowing into the diffuser pocket 40.

In the diffuser pocket 40, a first reinforcing fabric 48, which reinforces the second main sewed portion 47, and a second reinforcing fabric 49, which reinforces the upper side of the diffuser pocket 40, are coupled. The tear seam portion 47A is formed by sewing the first surface 44 and the second surface 45 together with the first reinforcing fabric 48. Further, the second reinforcing fabric 49, together with the diffuser pocket 40, is folded based on the upper side thereof. The first reinforcing fabric 48 and the second reinforcing fabric 49 are made of a flexible fabric material that may be substantially similar to a material forming the airbag 10. The first reinforcing fabric 48 and the second reinforcing fabric 49 are disposed in the diffuser pocket 40 at positions close to the tip portion of the inflator 20, thereby preventing the diffuser pocket 40 from being damaged by pressure of gas discharged from the inflator 20.

Hereinafter, a sequence of manufacturing the diffuser pocket 40 will be described.

Figure 9:
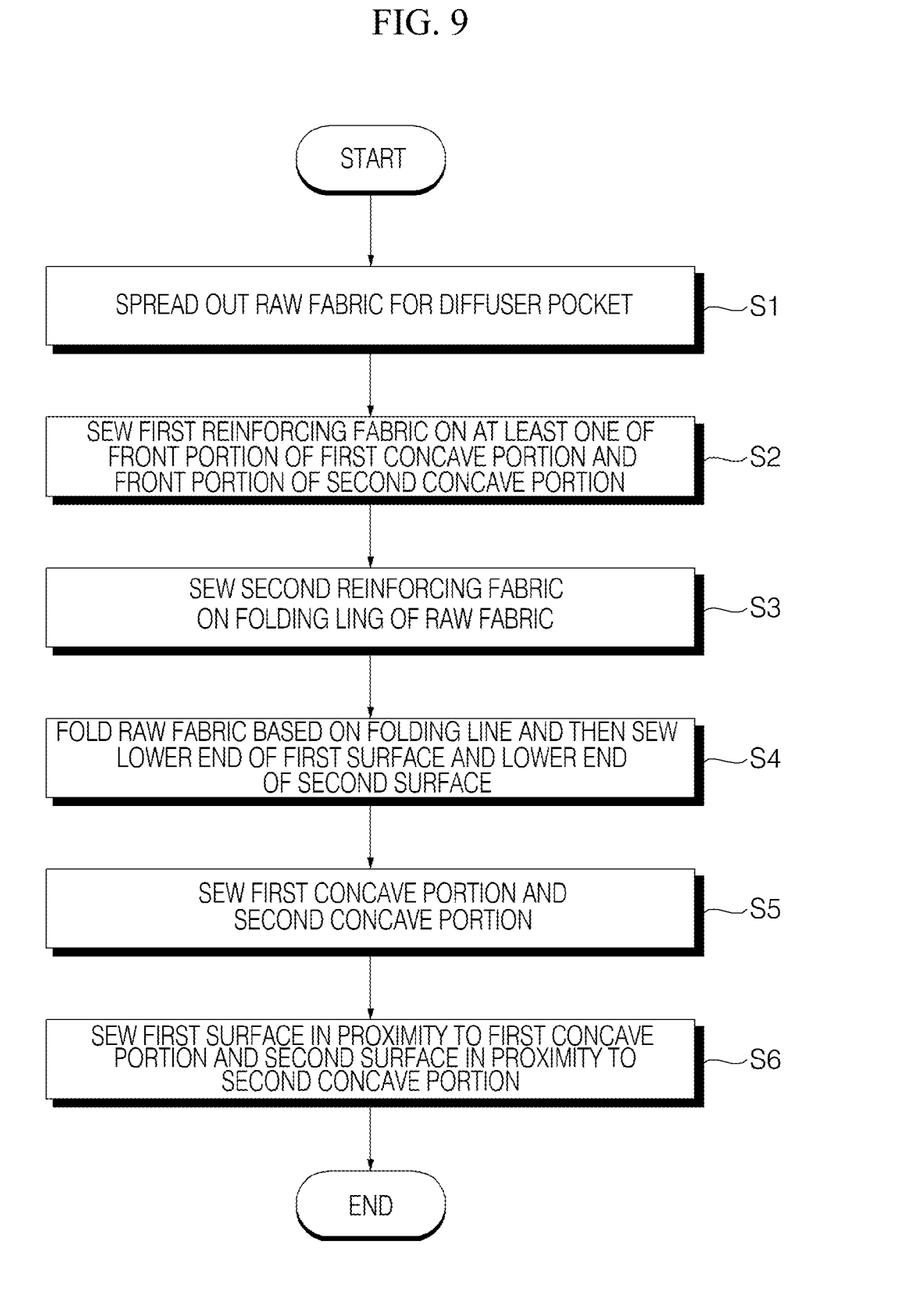
FIG. 9 is a flowchart of a method of manufacturing the curtain airbag apparatus according to an exemplary embodiment.

FIG. 9 is a flowchart of a method of manufacturing the curtain airbag apparatus according to an exemplary embodiment.

Referring to FIGS. 6 and 9, in a first step 51, a raw fabric for the diffuser pocket 40 is spread out. When the diffuser pocket 40 is spread out as illustrated in FIG. 6, the first concave portion 44A and the second concave portion 45A are formed at a rear end of the raw fabric for the diffuser pocket 40, so as to be spaced apart from each other in the vertical direction. A folding line L, which horizontally runs between the first concave portion 44A and the second concave portion 45A, is formed. The folding line L may be a virtual horizontal line that runs through a center of the diffuser pocket 40, and the raw fabric for the diffuser pocket 40 folded in half with respect to the folding line L.

When the raw fabric for the diffuser pocket 40 is spread out, the first surface 44 is disposed at one side of the folding line L, and the second surface 45 is disposed at the other side of the folding line L. After the raw fabric for the diffuser pocket 40 is folded with respect to the folding line L, the first surface 44 is formed as one surface of the diffuser pocket 40, and the second surface 45 is formed as the other surface of the diffuser pocket 40.

Referring to FIGS. 7 and 9, in a second step S2, the first reinforcing fabric 48 is placed on at least one of a front portion of the first concave portion 44A and a front portion of the second concave portion 45A, and then the raw fabric for the diffuser pocket 40 and the first reinforcing fabric 48 are coupled by sewing.

In a third step S3, the second reinforcing fabric 49 is placed on the folding line L, and then the raw fabric of the diffuser pocket 40 and the second reinforcing fabric 49 are coupled by sewing.

Referring to FIGS. 7 to 9, in a fourth step S4, the first main sewed portion 46 is formed by folding the raw fabric for the diffuser pocket 40 with respect to the folding line L, and then sewing the lower end 44B of the first surface 44 and the lower end 45B of the second surface 45. The raw fabric for the diffuser pocket 40 is folded in half with respect to the folding line L, and the second reinforcing fabric 49, together with the raw fabric for the diffuser pocket 40, is folded in half with respect to the folding line L. When the first main sewed portion 46 is formed as described above, a front end 44C of the first surface 44 and a front end 45C of the second surface 45 form the front discharge hole 42, through which gas discharged from the tip portion of the inflator 20 is discharged toward the front side in the airbag 10.

In a fifth step S5, the second main sewed portion 47 is formed by sewing the first concave portion 44A and the second concave portion 45A. When the second main sewed portion 47 is formed as described above, the rear discharge hole 43 through which gas discharged from the tip portion of the inflator 20 is discharged toward the rear side in the airbag 10, and the inflator insertion hole 41 into which the tip portion of the inflator 20 is inserted are formed at the rear end of the diffuser pocket 40.

In a sixth step S6, the tear seam portion 47A is formed by sewing the first surface 44, which is in proximity to the first concave portion 44A, and the second surface 45, which is in proximity to the second concave portion 45A. According to the present exemplary embodiment, since the first reinforcing fabric 48 is coupled to at least one of the front portion of the first concave portion 44A and the front portion of the second concave portion 45A, the tear seam portion 47A is formed by sewing the first surface 44 and the second surface 45 together with the first reinforcing fabric 48 in the sixth step S6. The tear seam portions 47A may be disposed only at portions of the first reinforcing fabric 48 closer to the front discharge hole 42 than the second main sewed portion 47, or may be disposed at the portions of the first reinforcing fabric 48 closer to the front discharge hole 42 than the second main sewed portion 47 and at the same position as the second main sewed portion 47.

According to the exemplary embodiments, the yarn used in the curtain air bag to sew the tear seam portion 47A, which is sewed in proximity to the second main sewed portion 47, may perform a shock-absorbing action while being broken by the pressure of gas in the diffuser pocket 40, thereby preventing the yarn used for the second main sewed portion 47 from being broken by the pressure of gas in the diffuser pocket 40.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A curtain airbag apparatus, comprising:
   an inflator configured to generate gas;
   an airbag configured to be inflated when the gas flows into the airbag; and
   a diffuser pocket disposed in the airbag and coupled to the inflator to distribute the gas to a front side and a rear side of the airbag, the diffuser pocket comprising:
      a first surface disposed at one side thereof;
      a second surface disposed at the other side thereof;
      a first concave portion formed at a rear end of the first surface;
      a second concave portion formed at a rear end of the second surface;
      a first reinforcing fabric disposed only on the first surface;
      a first main sewed portion on which a lower end of the first surface and a lower end of the second surface are sewed;
      a second main sewed portion on which the first concave portion and the second concave portion are sewed; and
      a tear seam portion on which the first surface in proximity to the first concave portion and the second surface in proximity to the second concave portion are sewed together with a single layer of the first reinforcing fabric therebetween.

2. The curtain airbag apparatus of claim 1, wherein a yarn used to sew the tear seam portion is configured to be broken by pressure of the gas in the diffuser pocket.

3. The curtain airbag apparatus of claim 1, wherein:
   the diffuser pocket further comprises:
      an inflator insertion hole into which a tip portion of the inflator is inserted;
      a front discharge hole configured to discharge a portion of the gas discharged from the tip portion of the inflator toward a front side of the airbag; and
      a rear discharge hole configured to discharge a portion of the gas discharged from the tip portion of the inflator is discharged to a rear side of the airbag;
   the inflator insertion hole is formed by the second main sewed portion;
   the front discharge hole is formed by the first main sewed portion; and
   the rear discharge hole is formed by the first main sewed portion and the second main sewed portion.

4. The curtain airbag apparatus of claim 1, further comprising:
   a second reinforcing fabric coupled to the diffuser pocket and configured to reinforce the upper side of the diffuser pocket,
   wherein the second reinforcing fabric is folded together with the diffuser pocket based on the upper side thereof.

5. A method of manufacturing a curtain airbag apparatus, the method comprising:
   spreading out a raw fabric for a diffuser pocket, the raw fabric comprising a first concave portion and a second concave portion disposed at a rear end thereof to be spaced apart from each other;
   placing a first reinforcing fabric only on a front portion of the first concave portion and sewing the raw fabric and the first reinforcing fabric;
   forming a first main sewed portion by folding the raw fabric with respect to a folding line that horizontally runs between the first concave portion and the second concave portion, and sewing a lower end of a first surface disposed at one side of the folding line and a lower end of a second surface disposed at the other side of the folding line;
   forming a second main sewed portion by sewing the first concave portion and the second concave portion; and
   forming a tear seam portion by sewing the first surface in proximity to the first concave portion and the second surface in proximity to the second concave portion together with a single layer of the first reinforcing fabric therebetween.

6. The method of claim 5, wherein a yarn used to sew the tear seam portion is configured to be broken by pressure of gas in the diffuser pocket.

7. The method of claim 5, wherein:
   forming the first main sewed portion comprises forming a front discharge hole configured to discharge a portion of gas discharged from a tip portion of an inflator toward a front side of the diffuser pocket; and
   forming the second main sewed portion comprises:
      forming a rear discharge hole configured to discharge a portion of the gas discharged from the tip portion of the inflator toward a rear side of the diffuser pocket; and
      forming an inflator insertion hole into which the tip portion of the inflator is inserted.

8. The method of claim 5, further comprising:
   placing a second reinforcing fabric on the folding line, and sewing the raw fabric and the second reinforcing fabric, after spreading out the raw fabric and before forming the first main sewed portion,
   wherein the second reinforcing fabric is folded with respect to the folding line together with the raw fabric to form the first main sewed portion.

* * * * *